(12) United States Patent
Jacob et al.

(10) Patent No.: US 12,135,240 B2
(45) Date of Patent: Nov. 5, 2024

(54) HEAT ASSISTED DETECTION AND RANGING BASED ON SPECTROPOLARIMETRIC IMAGING

(71) Applicant: Purdue Research Foundation, West Lafayette, IN (US)

(72) Inventors: Zubin Jacob, West Lafayette, IN (US); Fanglin Bao, West Lafayette, IN (US); Xueji Wang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 426 days.

(21) Appl. No.: 17/778,842

(22) PCT Filed: Dec. 6, 2020

(86) PCT No.: PCT/US2020/063521
§ 371 (c)(1),
(2) Date: May 22, 2022

(87) PCT Pub. No.: WO2021/113791
PCT Pub. Date: Jun. 10, 2021

(65) Prior Publication Data
US 2023/0341265 A1 Oct. 26, 2023

Related U.S. Application Data

(60) Provisional application No. 62/944,671, filed on Dec. 6, 2019.

(51) Int. Cl.
*G01J 3/28* (2006.01)
*G01J 3/00* (2006.01)
(Continued)

(52) U.S. Cl.
CPC ............ *G01J 3/2823* (2013.01); *G01J 3/00* (2013.01); *G01J 3/108* (2013.01); *G01J 3/447* (2013.01);
(Continued)

(58) Field of Classification Search
CPC .......... G06T 2207/10048; G06T 2207/10036; G01J 3/2823; G01J 2003/2826; G01J 3/10;
(Continued)

(56) References Cited

U.S. PATENT DOCUMENTS 6,064,510 A 5/2000 Gottlieb et al.
7,135,682 B1 11/2006 Lucey
(Continued)

FOREIGN PATENT DOCUMENTS

DE 102015220271 4/2017

OTHER PUBLICATIONS

Bradley, Spectropolarimetric Imaging Observations [Thesis], 2017 [retrieved Sep. 9, 2017], The University of Arizona, 236 pages. Retrieved https://repository.arizona.edu/handle/10150/624499 (Year: 2017).*

(Continued)

*Primary Examiner* — Matthew C Bella
*Assistant Examiner* — Dennis Rosario
(74) *Attorney, Agent, or Firm* — Piroozi-IP, LLC

(57) ABSTRACT

Summary: The invention relates to a temperature sensor, full-A magnetic element (3) that has at least one magnetic Layer (1), its magnetic properties depend on the temperature characterized in that—The magnetic layer (1) has a vortex-shaped magnetization distribution with a magnetic vortex core (2) has, wherein the vortex-shaped magnetization distribution is formed in a layer plane and the vortex core (2) is formed perpendicular to the layer plane,—An excitation unit (15) which is used to excite the vortex-shaped Magne-
(Continued)

tization distribution to a gyrotropic magnetization motion is provided,—A detection unit (16) for detecting a resonance frequency the gyrotropic magnetization movement is provided and—An evaluation unit (19) for determining a temperature from the resonance frequency of the gyrotropic magnetization movement is provided.

17 Claims, 11 Drawing Sheets

(51) Int. Cl.

| | | |
|---|---|---|
| *G01J 3/10* | (2006.01) | |
| *G01J 3/447* | (2006.01) | |
| *G01J 4/00* | (2006.01) | |
| *G01J 4/04* | (2006.01) | |
| *G01J 5/00* | (2022.01) | |
| *G01J 5/48* | (2022.01) | |
| *G01J 5/59* | (2022.01) | |
| *G01N 21/21* | (2006.01) | |
| *G01N 21/25* | (2006.01) | |
| *G01N 21/35* | (2014.01) | |
| *G06F 18/22* | (2023.01) | |
| *G06V 10/143* | (2022.01) | |
| *G06V 10/30* | (2022.01) | |
| *G06V 10/40* | (2022.01) | |
| *G06V 10/54* | (2022.01) | |
| *G06V 10/75* | (2022.01) | |

(52) U.S. Cl.
CPC ............... *G01J 4/00* (2013.01); *G01J 5/00* (2013.01); *G01J 5/485* (2022.01); *G01J 5/59* (2022.01); *G01N 21/21* (2013.01); *G01N 21/25* (2013.01); *G01N 21/35* (2013.01); *G06F 18/22* (2023.01); *G06V 10/143* (2022.01); *G06V 10/30* (2022.01); *G06V 10/40* (2022.01); *G06V 10/54* (2022.01); *G06V 10/751* (2022.01); *G06V 10/758* (2022.01); *G01J 2003/2833* (2013.01); *G01J 4/04* (2013.01); *G01J 2005/0077* (2013.01); *G06T 2207/10036* (2013.01); *G06T 2207/10048* (2013.01)

(58) Field of Classification Search
CPC ........ G01J 3/108; G01J 3/0289; G01J 3/0291; G01J 2005/0077; G01J 3/0224; G01J 3/00; G01J 2003/003; G01J 3/44; G01J 3/4406; G01J 3/4412; G01J 2003/4424; G01J 3/443; G01J 3/447; G01J 3/45; G01J 2003/451; G01J 3/42; G01J 3/433; G01J 3/427; G01J 2003/4275; G01J 3/4338; G01J 3/2889; G01J 3/2846; G01J 3/0254; G01J 3/0294; G01J 2003/1291; G01J 4/00; G01J 4/02; G01J 5/00; G01J 5/0003; G01J 5/0014; G01J 5/0018; G01J 5/0022; G01J 5/0025; G01J 5/0037; G01J 5/0044; G01J 5/004; G01J 5/0066; G01J 5/59; G01J 4/04; G01J 5/48; G06V 10/143; G01N 2021/3155; G01N 21/359; G01N 21/35; G01N 21/25; G01N 21/21; G01N 21/3581; G01N 2021/6419; G05D 1/0242; G06F 18/22
See application file for complete search history.

(56) References Cited

U.S. PATENT DOCUMENTS

| | | |
|---|---|---|
| 8,659,656 B1 | 2/2014 | Cruz-Albrecht et al. |
| 2006/0062448 A1* | 3/2006 | Hirsch ............... A61B 5/0062 |
| | | 382/154 |
| 2011/0261191 A1 | 10/2011 | Byren et al. |
| 2011/0304005 A1 | 12/2011 | Brueckl et al. |
| 2012/0183175 A1 | 7/2012 | Alouini et al. |
| 2020/0082159 A1 | 3/2020 | Pezzaniti et al. |

OTHER PUBLICATIONS

Gillespie et al., A Temperature and Emissivity Separation Algorithm for Advanced Spaceborne Thermal Emission and Reflection Radiometer (ASTER) Images. IEEE Transactions on Geoscience and Remote Sensing, 36 (4):1113-1125, Jul. 1998.
Gade et al. Thermal cameras and applications: a survey. Machine Vision and Applications 25:245-262, 2014.
Gurton et al., Enhanced facial recognition for thermal imagery using polarimetric imaging. Optics Letters, 39 (13):3857-3859, Jul. 2014.
Maccone et al., Quantum Radar. Physical Review Letters 124, 200503, 2020.
Rietjens et al., Expected performance and error analysis for SPEXone, a multi-angle channeled spectropolarimeter for the NASA PACE mission. In: Polarization Science and Remote Sensing IX, 11132, International Society for Optics and Photonics. Sep. 2019.
Smith et al., Studies in mid-infrared spectropolarimetry-II. An atlas of spectra. In: Monthly Notices of the Royal Astronomical Society. Feb. 21, 2000.
Jiang et al., Time-stretch LiDAR as a spectrally scanned time-of-flight ranging camera. Nature Photonics 14: 14-18, Jan. 14, 2020.
Rogers et al., A universal 3D imaging sensor on a silicon photonics platform. Nature, 590, Feb. 11, 2021.

* cited by examiner

HEAT ASSISTED DETECTION AND RANGING BASED ON SPECTROPOLARIMETRIC IMAGING

CROSS-REFERENCE TO RELATED APPLICATIONS

The present patent application is a 35 U.S.C. § 371 Nationalization Application of and claims the priority benefit of the International Patent Application Serial No. PCT/US20/63521 filed Dec. 6, 2020, which is related to and claims the priority benefit of U.S. Provisional Patent Application Ser. No. 62/944,671, filed Dec. 6, 2019, the contents of each of which are hereby incorporated by reference in its entirety into the present disclosure.

STATEMENT REGARDING GOVERNMENT FUNDING

This invention was made with government support under N66001-17-1-4048 awarded by the Defense Advanced Research Projects Agency. The government has certain rights in the invention.

TECHNICAL FIELD

The present disclosure generally relates to automated heat radiation analysis, and in particular, to a computer vision method of creating textures in infrared thermal images.

BACKGROUND

This section introduces aspects that may help facilitate a better understanding of the disclosure. Accordingly, these statements are to be read in this light and are not to be understood as admissions about what is or is not prior art.

Autonomous vehicle navigation technologies are becoming more commonplace in certain vehicles. Object detection and ranging (distance of object from the vehicle) is of vital importance for these technologies. However, object detection and ranging proves to be specially challenging given the wide-ranging obstacles (e.g., road signs, road objects, other vehicles, etc.), harsh environments (bright daylight as well as pitch blackness of dark nights), and unknown terrains encountered in scenarios such as off-road driving.

The technology of choice for detection and ranging is LIDAR (light detection and ranging). LIDAR is based on illuminating an object by a laser and measuring laser return times and wavelength. These parameters can be used to generate a three dimensional (3D) map of the object and its distance from the vehicle (i.e., source of the illuminating laser). However, LIDAR's effectiveness falls rapidly with distance. Additionally, with a growing number of autonomous vehicles, LIDAR detection becomes cumbersome as the same object may be illuminated with multiple LIDARs.

An alternative technology involves use of passive 3D vision, which use optical (visible) stereovision; where cost-effective red-green-blue (RGB) cameras are used for scene analysis. This approach however suffers from challenges associated with stereovision, where the errors accumulated in ranging (i.e. depth estimation) increase quadratically with distance. Furthermore, there exist no systematic procedures for target recognition or semantic segmentation for applications such as off-road navigation.

Thermal images provide completely passive approach to detection and ranging. However, the lack of texture in thermal images leads to lack of discernible object features to the eye or to a computer system. This is a serious issue in using infrared thermal images for autonomous navigation.

Therefore, there is an unmet need for improving and creating textures in an infrared thermal image to address object detection, classification, and ranging for autonomous vehicle navigation.

SUMMARY

A method of generating object surface texture in thermal infrared images is disclosed. The method includes receiving heat radiation from a scene by a spectropolarimetric imaging system adapted to generate a plurality of spectral frames associated with the scene. The method also includes generating the plurality of spectral frames associated with the scene, each frame having a plurality of pixels. Furthermore, the method includes for each pixel from the generated plurality of spectral frames, extracting spectral information associated with the scene, including pixel-specific temperature representing an object's temperature, and thermal texture factor representing the object's texture. Additionally, the method includes for each of a plurality of materials having a specific emissivity in a library, generating reference spectral information as a function of temperature and thermal texture. Furthermore, the method includes matching the extracted spectral information for each pixel from the generated plurality of spectral frames to the generated reference spectral information using a statistical method to minimize the associated variation, and extracting spectral metadata from the matched reference spectral information for the associated material based on the match.

According to one embodiment of the method, the plurality of spectral frames from the spectropolarimetric imaging system are each generated by applying a plurality of associated bandpass filters to the spectropolarimetric imaging system and passing the heat radiation therethrough.

According to one embodiment of the method, the extracted spectral information associated with the scene from the spectropolarimetric imaging system for each pixel from the generated plurality of spectral frames is based on $$N_i = \sum_{v=v_{min}}^{v_{max}} Z_v \mathbb{T}_{iv} S_v \Delta v \equiv \sum_v \mathbb{M}_{iv} S_v,$$

$$\mathbb{M}_{iv} \equiv Z_v \mathbb{T}_{iv} \Delta v,$$

where $N_i$ represents output of the spectropolarimetric imaging system for each application of the associated bandpass filter i, v represents frequency, $\mathbb{T}_{iv}$ represents transmittance curve of each pixel of the plurality of spectral frames for discretized frequency bands between $v_{min}$ and $v_{max}$ for each application of the bandpass filter, $\Delta v$ represents width of discretized frequency band, $Z_v$ represents response curve of each pixel of the plurality of the spectral frames, $\mathbb{M}_{iv}$ is a transformation matrix for each application of the bandpass filter, and where $S_v$ represents the extracted spectral information associated with the scene, where $S_v = (\mathbb{M}_{iv})^{-1} N_i$.

According to one embodiment of the method, the generated reference spectral information from the spectropolarimetric imaging system as a function of temperature and material texture for each material in the library is obtained from:

$$S_{vm} = \varepsilon_{vm} B_v + (1 - \varepsilon_{vm}) X B_v^0,$$

where $$B_v \equiv B_v(v, T) = \frac{2hv^3}{c^2} \frac{1}{e^{\frac{hv}{\kappa_B T}} - 1}, B_v^0 \equiv B_v(v, T_0),$$

where, $\kappa_B$ is the Boltzmann constant,
h is the Planck constant,
c is the speed of light,
m represents a material chosen from the library,
T represents the temperature of the target,
$T_0$ represents the ambient temperature,
$\varepsilon_{vm}$ represents the emissivity of the chosen material, and
X represents thermal texture factor.

According to one embodiment of the method, the generated reference spectral information from the spectropolarimetric imaging system as a function of temperature and material texture for each material in the library includes a family of spectral curves i) based on a plurality of temperatures and ii) for each temperature of the plurality of temperatures, based on variation of thermal texture factor (X), wherein the thermal texture factor is a variable between 0 and 1.

According to one embodiment of the method, the matching of the extracted spectral information for each pixel from the spectropolarimetric imaging system from the generated plurality of spectral frames to the generated reference spectral information is based on matching $S_v$ to $S_{vm}$.

According to one embodiment of the method, the statistical method includes sum of least mean squares between the $S_v$ and $S_{vm}$ meeting a predetermined threshold.

According to one embodiment of the method, the statistical method includes a minimum least mean squares between the $S_v$ and $S_{vm}$.

According to one embodiment of the method, the spectropolarimetric imaging system is further adapted to generate a plurality of polarization frames associated within the scene.

According to one embodiment the method further includes generating the plurality of polarization frames associated with the scene, each frame having a plurality of pixels.

According to one embodiment of the method, the plurality of linear polarization frames from the spectropolarimetric imaging system includes liner polarization at 0°, 45°, 90°, and −45°, thereby generating $I_0$, $I_{45}$, $I_{90}$, and $I_{-45}$ frames.

According to one embodiment of the method, for each pixel from the generated plurality of polarization frames, further extracting spectral information associated with the scene based on the polarization angles ($S_{vp}$).

According to one embodiment of the method, the generated reference spectral information from the spectropolarimetric imaging system as a function of temperature and material texture for each material in the library includes a family of spectral curves ($S_{vmp}$) i) based on a plurality of temperatures, ii) for each temperature of the plurality of temperatures, based on variation of thermal texture factor (X), wherein the thermal texture factor is a variable between 0 and 1, and for each thermal texture factor (X), based on variation of polarization angle including 0°, 45°, 90°, and −45°

According to one embodiment of the method, the statistical method includes sum of least mean squares between the $S_{vp}$ and $S_{vmp}$ meeting a predetermined threshold.

According to one embodiment of the method, the statistical method includes a minimum least mean squares between the $S_{vp}$ and $S_{vmp}$.

DETAILED DESCRIPTION

Figure 1:
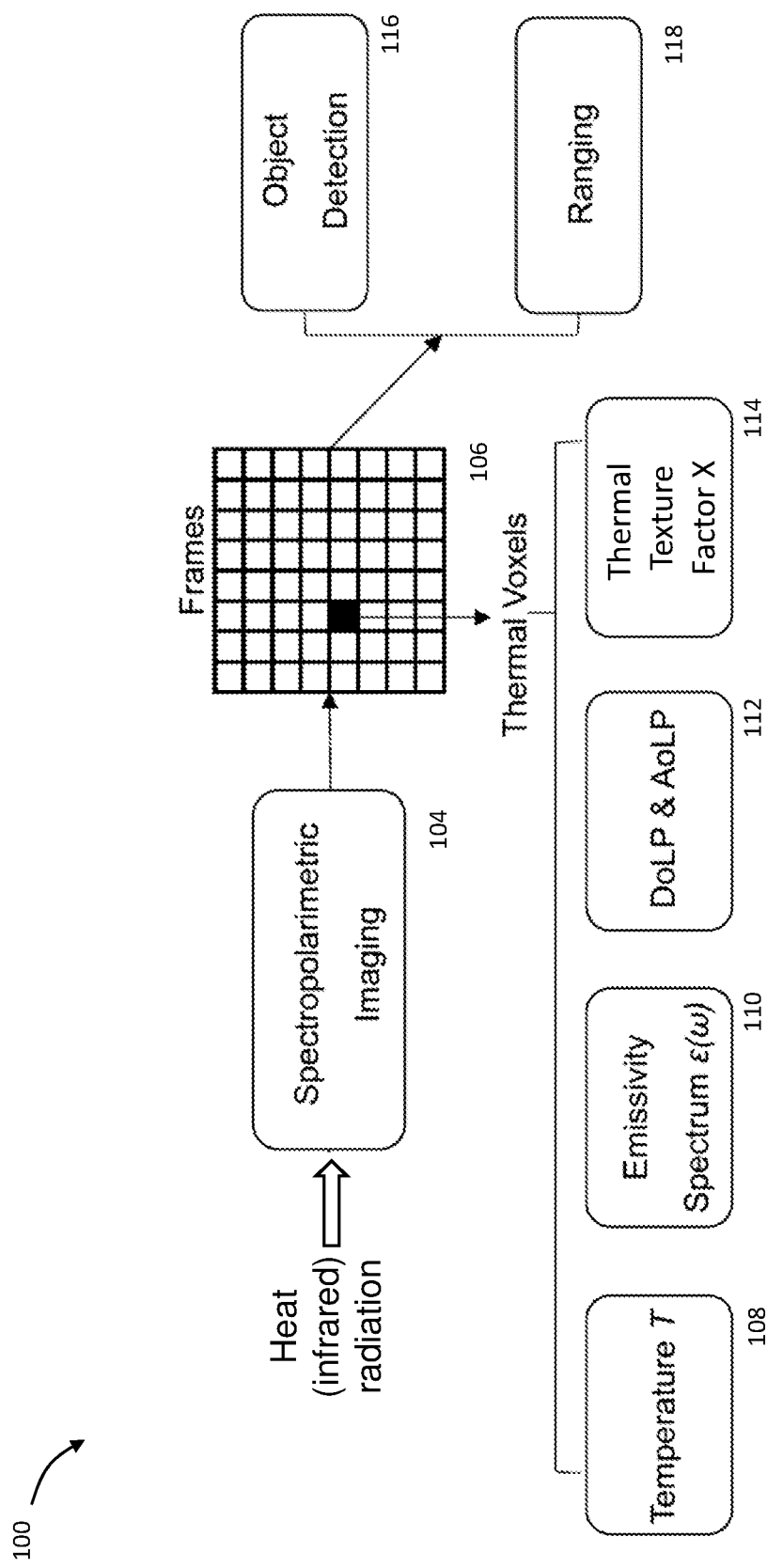
FIG. 1 is a high level schematic diagram of a HADAR system, including a spectropolarimetric imaging system, according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

The present disclosure provides a novel approach for object ranging that can be used in a variety of applications including autonomous vehicle navigation. This novel approach is based on detection of heat signature of objects, near and far away. Towards this end, the present disclosure describes a heat assisted detection and ranging (HADAR) approach which is based on capturing heat radiation—the intrinsic heat signature of a body—and can provide the unique spectral fingerprint for tactical semantic segmentation of scenes. Additionally, as infrared heat radiation in the 8-14 micron range—long wavelength infrared, (LWIR)—is omnipresent and can be exploited at day or night.

In order to use heat signature as a primary source of information for autonomous vehicle navigation, several challenges must be addressed: 1) Ghosting (i.e., since heat radiation is omnipresent, the signal is cluttered with environmental thermal signals that cause diminished features or textures in thermal images, thereby necessitating new algorithms that distinguish useful target information from the environmental heat signatures that swamp or clutter the scene); and 2) passive ranging accuracy and 3D vision capabilities of IR cameras suffer from the errors fundamental to stereomatching, discussed below.

Referring to FIG. 1, a high level schematic diagram of a HADAR system 100 is shown. The HADAR system 100 is adapted to receive heat signature in the form of IR radiation from objects and direct the radiation to a spectropolarimetric imaging system 104, which is adapted to generate a plurality of frames 106, each including a plurality of pixels. Each pixel is associated with metadata, discussed below. A pixel and its associated metadata is referred to herein as a thermal voxel which includes metadata information about temperature, shown as block 108, emissivity spectrum ε(ω), shown as block 110, degree of linear polarization (DoLP) and angle of linear polarization (AoLP), shown as block 112, and thermal texture factor X (a concept introduced to identify the intrinsic object thermal photons (signal) vs. extrinsic environmental thermal photons (noise) in the spectral domain entering the spectropolarimetric imaging system 104 which is focused on a target), identified as block 114. With the above-identified thermal data associated with each thermal voxel, a processing system (not shown) either local to the HADAR system 100 or remote therefrom (e.g., a cloud-based system), detects the object, as shown in block 116; and further determines the range (i.e., distance) of the object from the HADAR system 100, as shown in block 118. Each of these blocks is described below in detail.

The optimal feature for HADAR arises from the spatio-temporal dependence (x, y, z, t) of precisely these mentioned thermal voxel properties. Temperature and spectral emissivity are intrinsic properties of the thermal voxel whereas the DoLP, AoLP and thermal texture factor X involves a subtle interplay of intrinsic and extrinsic thermal photons. Intrinsic photons governed by spectral emissivity are thermally emitted by the target while extrinsic photons are thermally emitted by the environment then reflected off the object and reach the camera which is focused on the object.

In order to determine temperature associated with each thermal voxel, a method according to the present disclosure begins with a first estimate of an average environmental temperature (assumed to be a global constant for all pixels) through an on-board thermometer or GPS-assisted weather data.

In order to determine temperature of each pixel as part of the metadata of the thermal voxel, following the decoupling of intrinsic and extrinsic signals of every pixel, in a first iteration the method of the present disclosure identifies the hottest object and coldest object in the scene. In the second iteration, the environmental temperature is updated locally for every pixel but keeping it within the hot/cold bounds of these two values since the thermal noise from nearby objects dominates the scene. A clustering approach is exploited from unsupervised learning to de-noise the data and guide the scene analysis through publicly available atmospheric models (e.g., MODTRAN). It is also possible to segment the pixels according to noise class and identify global vs. local noisy variations in emissivity/temperature.

Figure 2:
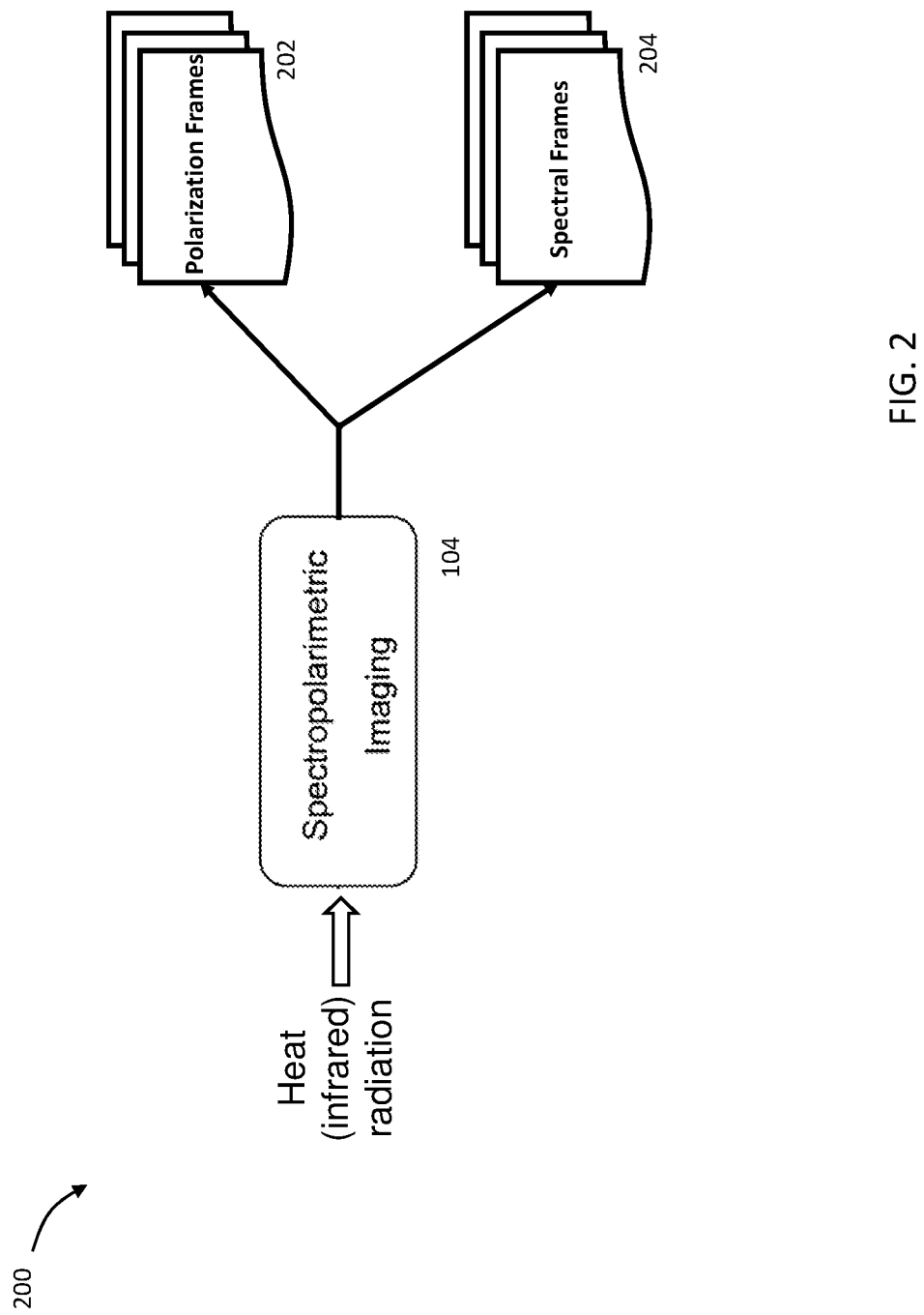
FIG. 2 is a high-level schematic of outputs of the spectropolarimetric imaging system of FIG. 1.

To better elucidate these techniques, reference is now made to FIG. 2, which is a high-level schematic of outputs of the spectropolarimetric imaging system 104. There are several possibilities for this type of spectropolarimetric imaging system 104, including a hyperspectral camera or other types of cameras known to a person having ordinary skill in the art. In any of these cases, the spectropolarimetric imaging system 104 provides two types of output: 1) polarization frames as shown in the frames 202; and 2) spectral frames, as shown in the frames 204. These polarization and spectral frames (202 and 204) are based on a plurality of different settings. For example, according to one embodiment, the polarization frames 202 include transmitted light from the spectropolarimetric imaging system 104 providing linearly polarized light at 0 degree, thereby generating a raw polarized image frame ($I_0$ frame). Next, the spectropolarimetric imaging system 104 is adapted to provide linear polarization at 45°. A raw polarized image frame ($I_{45}$ frame) is thus obtained. Continuing, the spectropolarimetric imaging system 104 is further adapted to provide a linear polarization at 90°. A raw polarized image frame ($I_{90}$ frame) is thus obtained. Next, the spectropolarimetric imaging system 104 is further adapted to provide linear polarization at 135° (−45°). A raw polarized image frame ($I_{-45}$ frame) is thus obtained. These example-only four polarized image frames are shown in the frames 202.

Next, according to one embodiment, the spectral frames 204 include transmitted light from the spectropolarimetric imaging system 104 providing spectral frames at a plurality of different spectral frequencies based on application of a plurality of bandpass filters each with a bandwidth ($v_l$–$v_h$). According to one embodiment, nine bandpass filters are applied each providing a spectral frame. These example-only spectral frames are shown in the frames 204.

Figure 3:
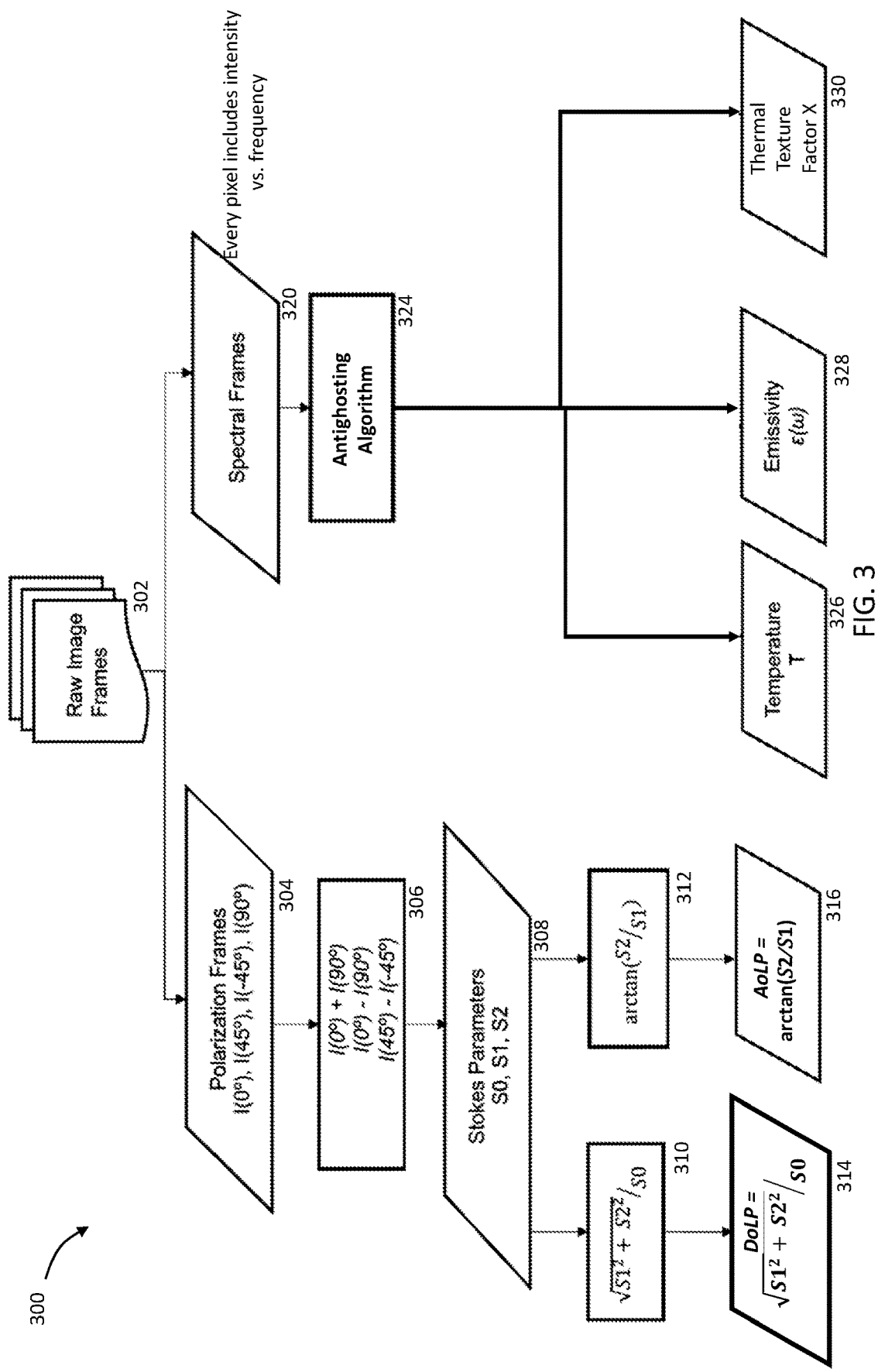
FIG. 3 is a flowchart of a method for determining metadata for each pixel of the spectropolarimetric imaging system of FIG. 1, including an antighosting method for determining spectral metadata.

Reference is now made to FIG. 3, where a method 300 of determining metadata for each pixel is shown. First, As discussed above, two types of tunability is carried out by the spectropolarimetric imaging system 104, including polarization and spectral tunability. First, the polarization tunability is shown with respect to polarization frames 304 (including, as discussed above according to one embodiment, fames ($I_0$, $I_{45}$, $I_{90}$, and $I_{-45}$).

Next mathematical operations are performed on these raw polarized frames ($I_0$, $I_{45}$, $I_{90}$, and $I_{-45}$) as shown in block 306 and these three Stokes parameter maps (S0, S1, S2) are calculated from these operation as shown in Block 308 and provided below.

$$S0 = I_0 + I_{90}, S1 = I_0 - I_{90}, \text{ and } S2 = I_{45} - I_{-45}.$$

Next mathematical operations are performed on these Stokes parameter maps (S0, S1, S2) as shown in blocks 310 and 312 and DoLP and AoLP are then assigned based on these mathematical operations (see below) as shown in blocks 314 and 316. From these stokes parameters, the DoLP map and AoLP map are calculated from the three Stokes parameters maps.

$$\text{DoLP} = \sqrt{S1^2 + S2^2}/S0, \text{AoLP} = \arctan(S2/S1)$$

Thus two of the metadata (AoLP and DoLP) are obtained based on the operations of half of the flowchart of the method 300. With continued reference to FIG. 2, the method 300 proceeds to determine the remainder of the metadata (i.e., T, emissivity: ε(ω), and thermal texture Factor X). Initially, in block 320 spectral frames are obtained from the spectropolarimetric imaging system 104, as discussed above (i.e., a plurality, e.g., 9, bandpass filters are applied to the spectropolarimetric imaging system 104, each generating a bandlimited response from the scene). The method of obtaining the spectral frames is further discussed with reference to FIG. 3. Next, in block 324 the radiation spectrum is reconstructed using an antighosting algorithm, discussed further below, from which in blocks 326, 328, and 330 the remaining metadata (T, ε(ω), and Thermal Lightning Factor X) are determined. The antighosting algorithm, referenced in block 324, is further disclosed in FIG. 4.

Figure 4:
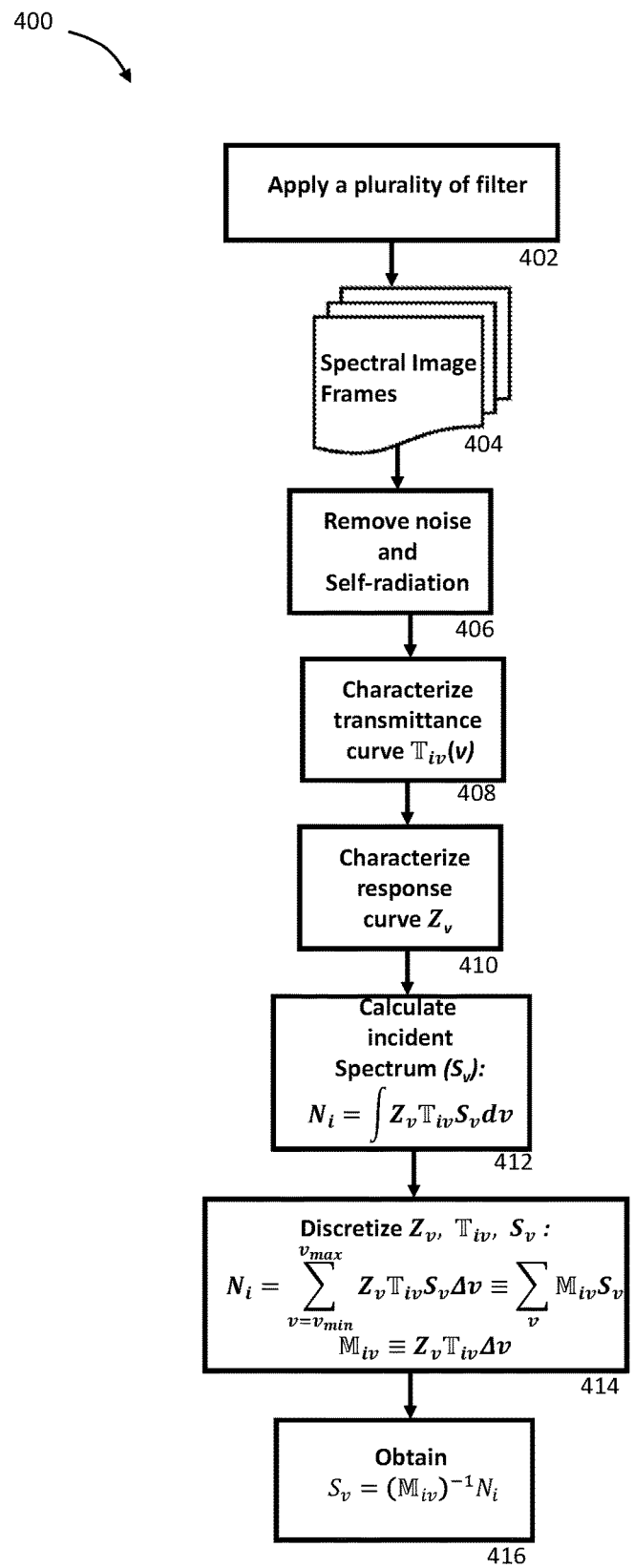
FIG. 4 is a flowchart for the antighosting method of FIG. 3.

With reference to FIG. 4, an antighosting method 400 is presented. Initially, in block 402, as discussed above, a plurality of bandlimited bandpass filters are applied to the incoming heat radiation. In one embodiment, nine such bandpass filters are applied. Each of these filters results in a frame including intensity between a lower bandpass level and an upper bandpass level. In other words, for example, for i=1 (i.e., bandpass filter number 1, according to the above example), the frame includes intensity for $v_{l1}$ and $v_{h1}$, where $v_{l1}$ is the lower bandpass level, and $v_{h1}$ is the upper bandpass level. With reference back to FIG. 4, these spectral image frames are shown in block 404. Next in block 406, the dark noise of the spectropolarimetric imaging system 104 (see FIG. 1) and self-radiation of any bandpass filters are calibrated out, so that output of the spectropolarimetric imaging system 104 (see FIG. 1) is purely caused by incident heat radiation $S_v$. To achieve this noise removal and calibration, a black body source, known to a person having ordinary skill in the art, is used to measure noise response from the spectropolarimetric imaging system 104 (see FIG. 2).

Next, in block 408, the transmittance curve $\mathbb{T}_{iv}$ of each spectral filter i is characterized, which is a function of frequency (v). This transmittance curve $\mathbb{T}_{iv}$ measurement is performed once using a spectrometer (i.e., frequency/wavelength bands that are generated each time a bandpass filter is applied. Measurements are made by identifying a band of frequency that passes through the filter.

Next, in block 410, the response curve $Z_v$ of each sensor pixel is characterized. At a first level of approximation, a constant response curve can be assumed for each pixel across a range of frequencies (e.g., for i=1, across $v_{l1}$ and $v_{h1}$). Alternatively, response of each pixel with respect to the frequency range can be ascertained. The response is usually provided by the manufacturer of the spectropolarimetric imaging system 104 (see FIG. 2), or the response be can characterized by a spectrometer, as known to a person having ordinary skill in the art. Next in block 412, the incident spectrum $S_v$ for each i is calculated. The relationship between $S_v$ and the other parameters discussed above is provided below:

$$N_i = \int Z_v \mathbb{T}_{iv} S_v dv,$$

where $N_i$ is the output of the spectropolarimetric imaging system 104 (see FIG. 2), $\mathbb{T}_{iv}$ is the transmittance curve of each raw spectral frames, $Z_v$ is the response curve. To solve the above equation, as shown in block 414, each frequency band is discretized into a plurality of discrete frequency segments. By doing this discretization, the above equation can be rewritten as:

$$N_i = \sum_{v=v_{min}}^{v_{max}} Z_v \mathbb{T}_{iv} S_v \Delta v \equiv \sum_v \mathbb{M}_{iv} S_v,$$

$$\mathbb{M}_{iv} \equiv Z_v \mathbb{T}_{iv} \Delta v.$$

Figure 5A:
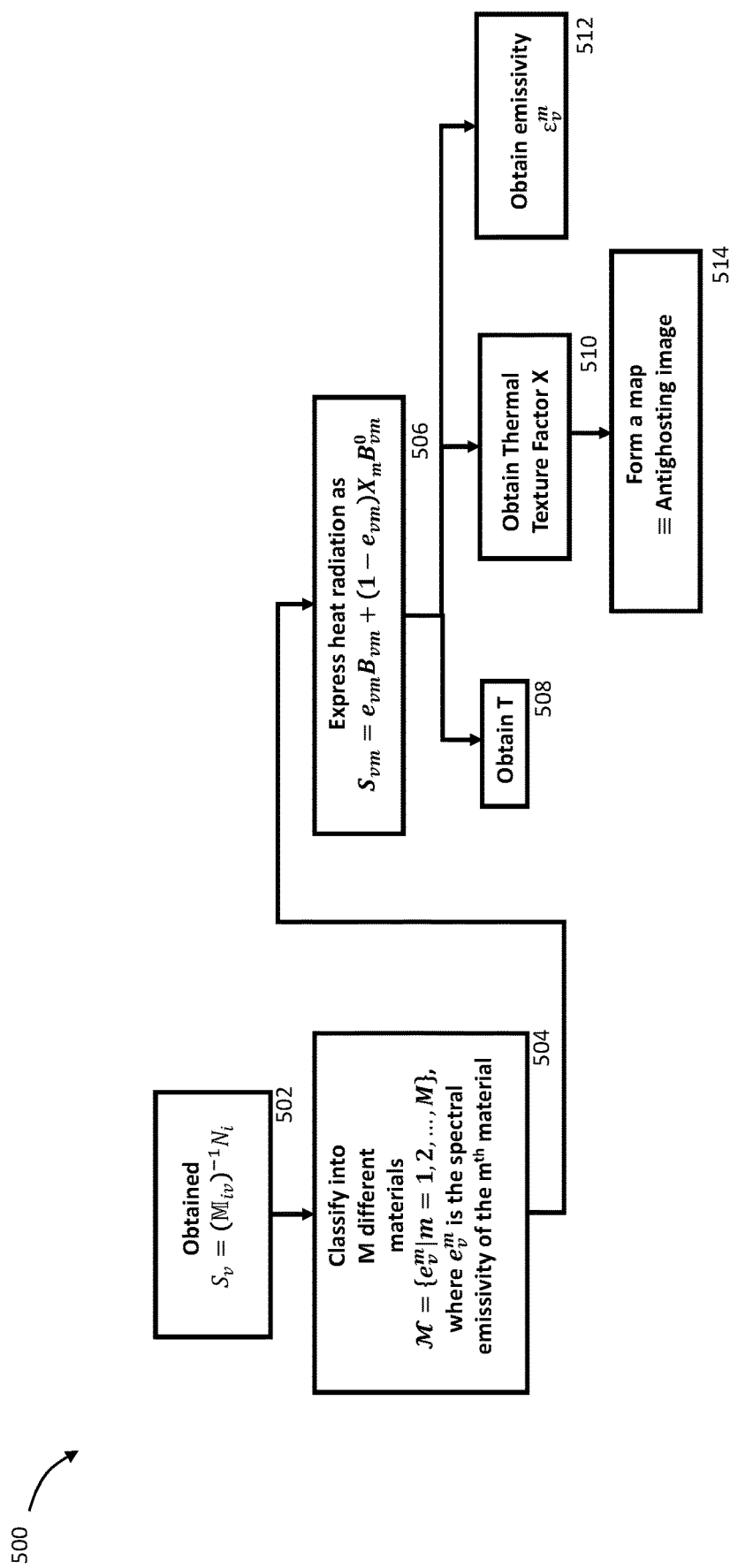
FIG. 5a is a flowchart presenting specific steps for generating spectral metadata, including a matching method to a predetermined library.

1. From the above relationship, spectrum $S_v$ can be obtained as $S_v = (\mathbb{M}_{iv})^{-1} N_i$, as shown in block 416. Once the spectrum $S_v$ has been obtained, then other metadata can be extracted, as discussed below. Towards this end, reference is made to FIG. 5a and the method 500. The method 500 begins with the obtained $S_v$ in block 502. According to one embodiment of the present disclosure, in order to find the other metadata, the reconstructed $S_v$ is compared to a library of material M, as shown in block 504. For each material in the library having a specific emissivity ($\varepsilon(\omega)$), heat radiation is expressed in terms of a pseudo-3-dimensional curve $S_{vm}$ which is dependent on and thermal factor X and T as provided in the equation below. Thermal factor X is a parameter between 0 and 1 which defines surface texture of a material.

$S_{vm} = \varepsilon_{vm} B_v + (1 - \varepsilon_{vm}) X B_v^0$, as shown in block 506, where $$B_v \equiv B_v(v, T) = \frac{2hv^3}{c^2} \frac{1}{e^{\frac{hv}{\kappa_B T}} - 1}, B_v^0 \equiv B_v(v, T_0),$$

where, $\kappa_B$ is the Boltzmann constant, h is the Planck constant, c is the speed of light, m represents a material chosen from the library, T represents the temperature of the target, $T_0$ represents the ambient temperature, $\varepsilon_{vm}$ represents the emissivity of the chosen material, and X represents thermal texture factor.

Once a material with the above spectrum $S_{vm}$ has been matched to the obtained spectrum $S_v$, the other metadata are obtained, as shown in blocks 508, 510, and 512. From the thermal texture factor X, a map constituting an antighosting image can be generated.

Figure 5B:
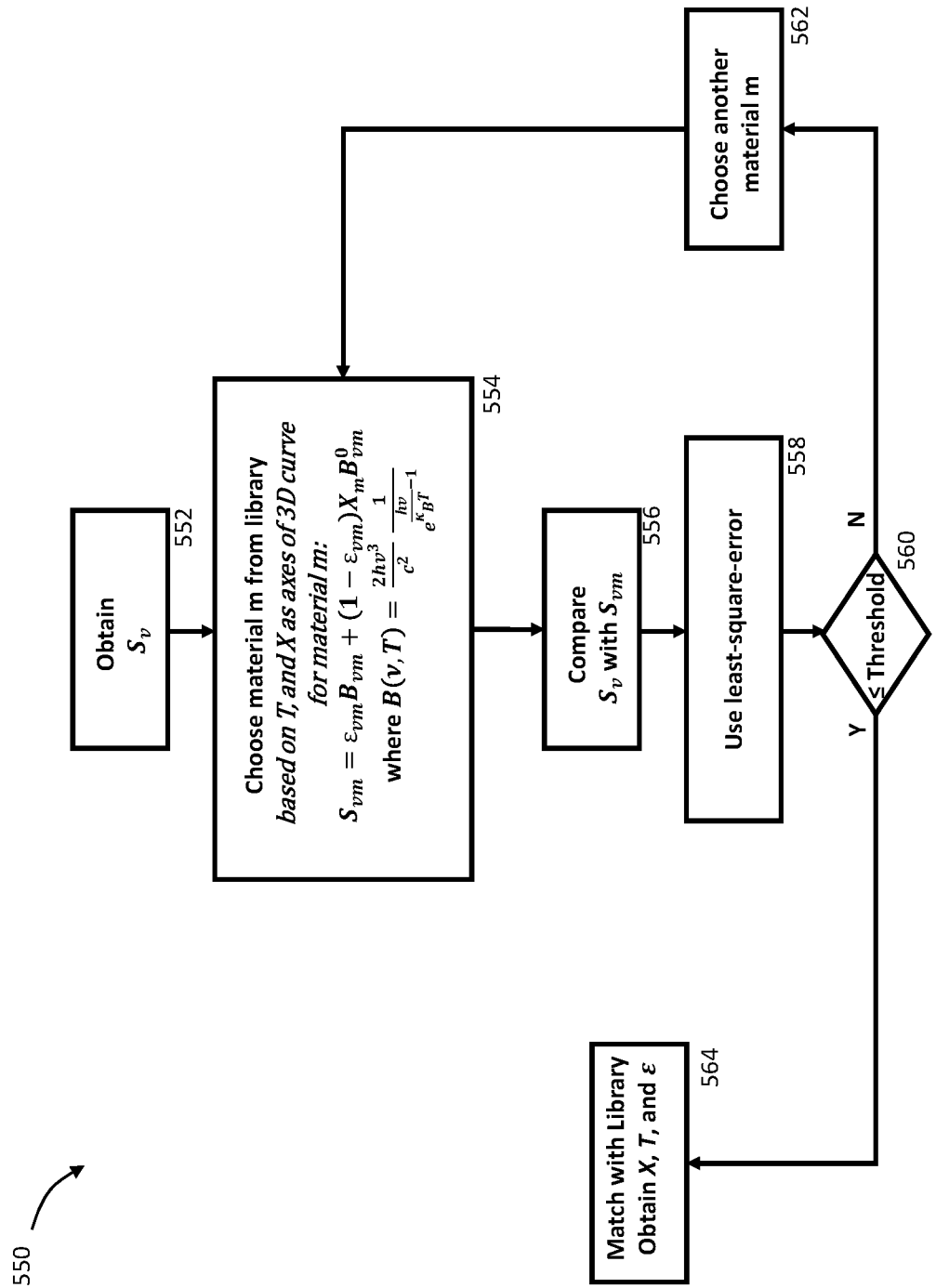
FIG. 5b is a flowchart depicting one example method for matching to the predetermined library.

With reference to FIG. 5b, one example algorithm is provided showing a method 550 for matching the obtained spectrum $S_v$ against the library spectrum $S_{vm}$. The method 550 begin in block 552 with the obtained spectrum $S_v$. A material from the library is chosen representing the material in the scene which the heat images are obtained from. The material spectrum $S_{vm}$ is governed by the equation provided above, as provided in block 554. These two spectra ($S_v$ and $S_{vm}$) represent three dimensional curves, as discussed above. The two spectra are compared with each other, as provided in block 556. Using a comparison technique, e.g., least-square-error, as shown in block 558, a distinction between these two spectra is determined. This distinction is compared to a threshold, as shown in query 560. If the threshold is not met, then the method 550 chooses another material, as provided in block 562 and returns to block 554. If the threshold is met, then a match is ascertained and the method 550 proceeds to identifying the remaining metadata, as shown in block 564.

According to another approach, $S_{vm}$ for all materials in the library are determined. Next, comparisons between $S_{vm}$ and $S_v$ can be made and using a least square error method (sum of the least square errors in the aforementioned comparison) the minimum of least squares is chosen as a positive match to a selected material in the library.

Figure 6A:
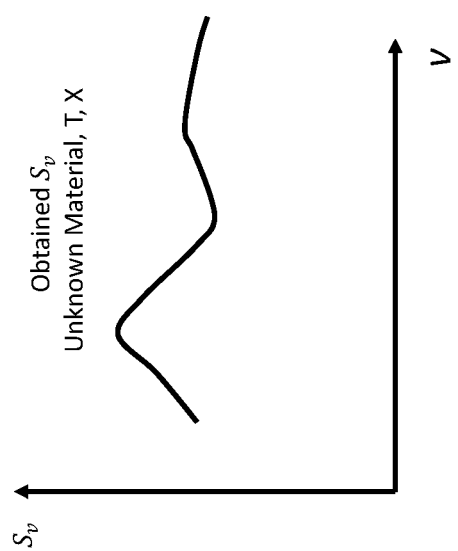
FIGS. 6a-6d represents graphs of spectra (FIGS. 6a, 6c, 6d) and B which is black body radiation (FIG. 6b) vs. frequency in order to demonstrate the steps of matching.
Figure 6B:
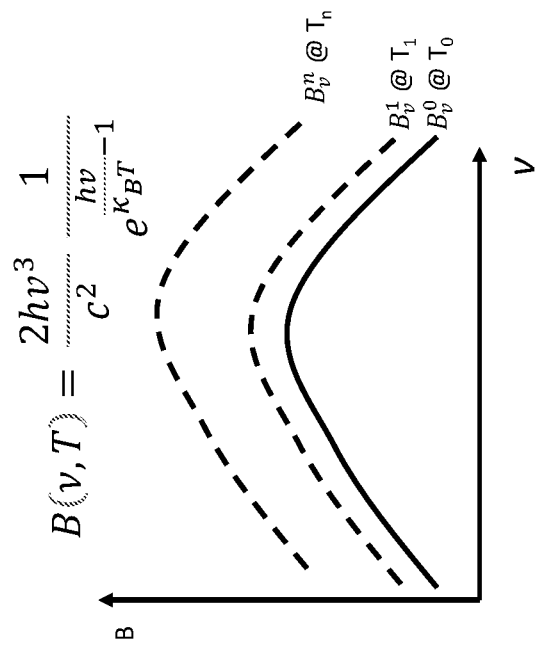
Figures 6C, 6D:
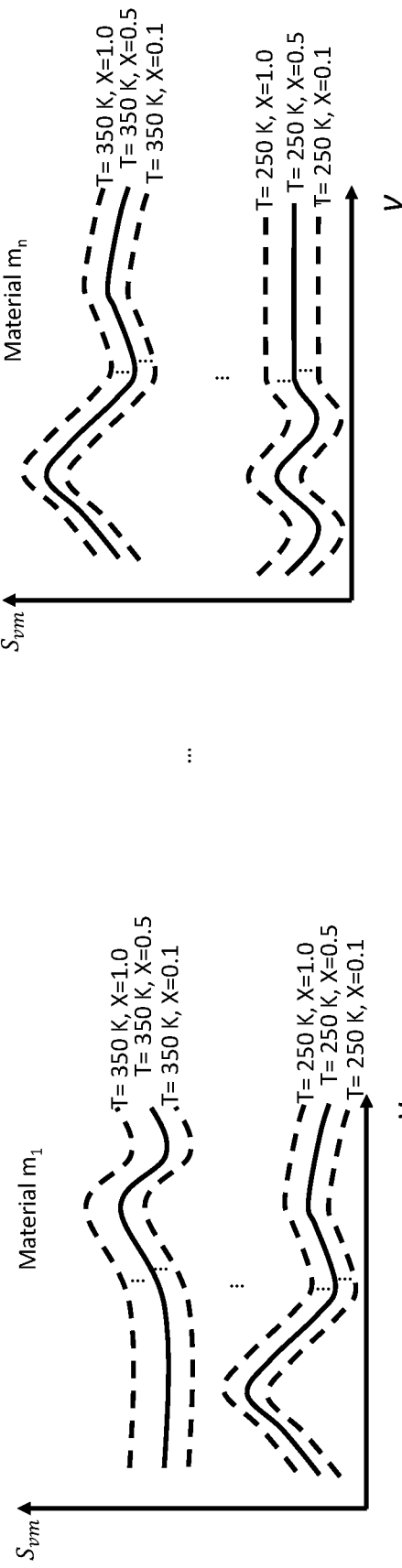

To demonstrate these techniques, example graphs are provided in FIGS. 6a-6d. First, the spectrum $S_v$ of the image from the scene is shown as a function of frequency in FIG. 6a (see block 416 of FIG. 4). Next, for different temperature B (which is black body radiation) is determined and plotted vs. frequency, as shown in FIG. 6b (see block 554 in FIG. 5b) for different temperatures. $B_v$ at T=273° K is $B_v^0$. Next, $S_{vm}$ for different materials is obtained by plotting $S_{vm}$ as a function of frequency for different temperatures and different X values. The temperature can be chosen based on a priori knowledge of the ambient temperature. As discussed X values range between 0 and 1. These graphs as generated for each material ($m_1 \ldots m_n$). Once these $S_{vm}$ graphs are generated, the $S_v$ from the scene is compared in a manner discussed according to FIG. 5b or an alternate plan as discussed above and a match is obtained for T, X, and a material (i.e., ε).

Figure 7B:
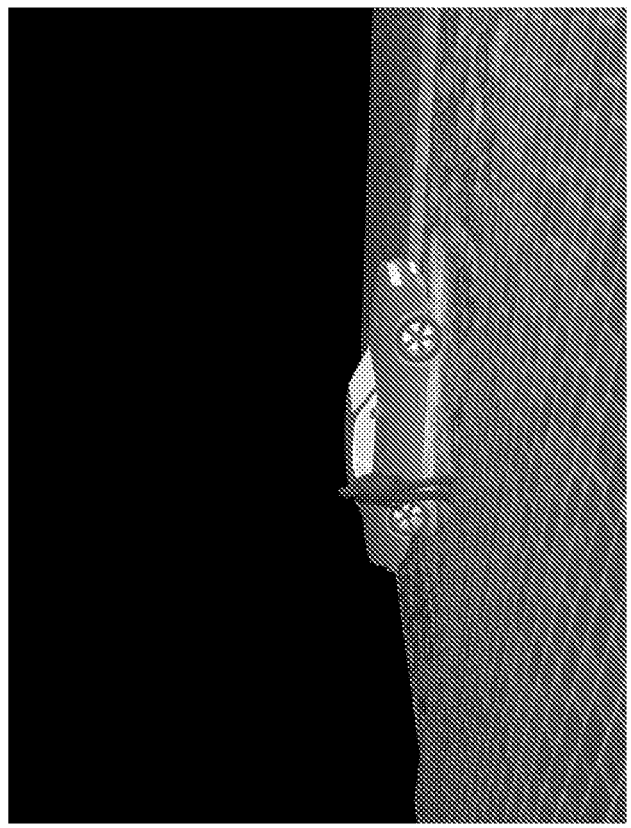
FIGS. 7a-7d are example images where standard infrared images (FIGS. 7a and 7c), are processed according to the present disclosure, thereby generating surface textures for enhanced visualization (FIGS. 7b and 7d).
Figure 7A:
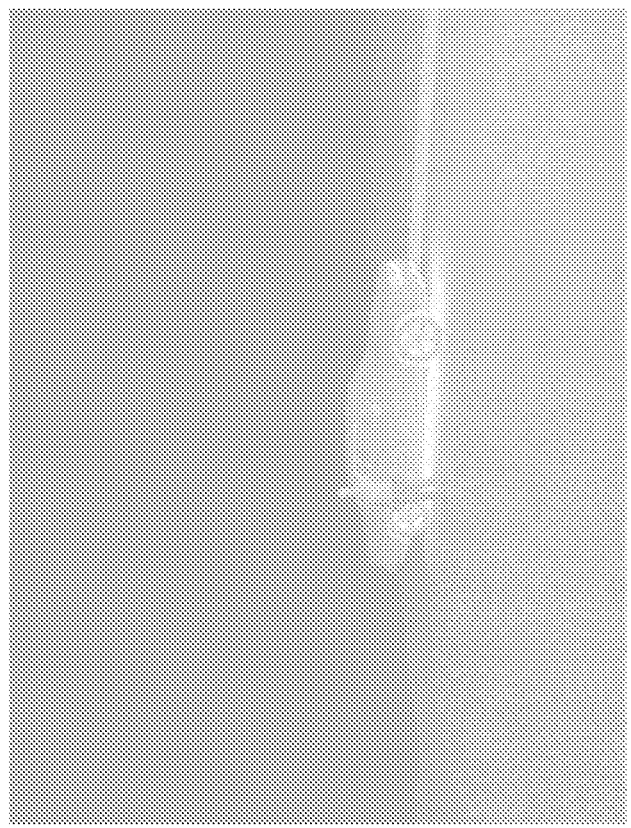
Figure 7D:
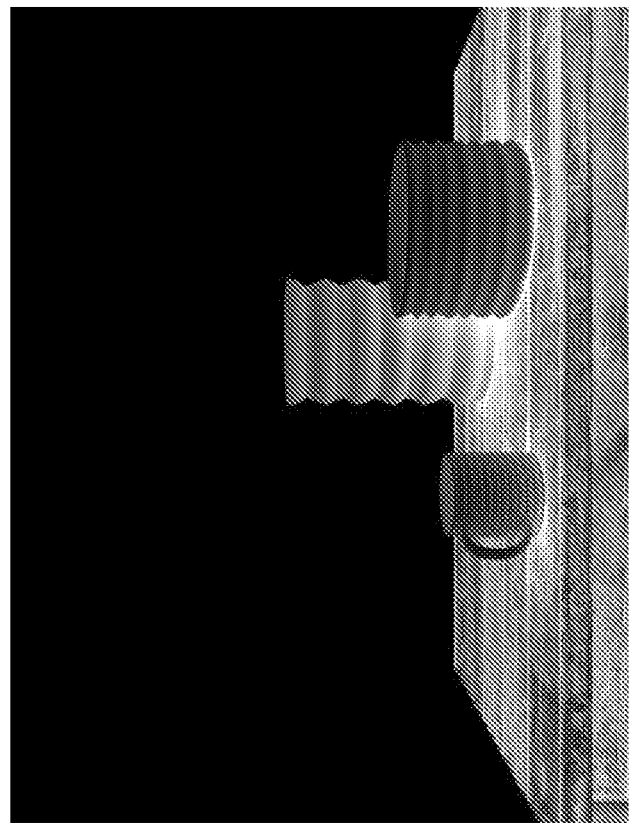
Figure 7C:
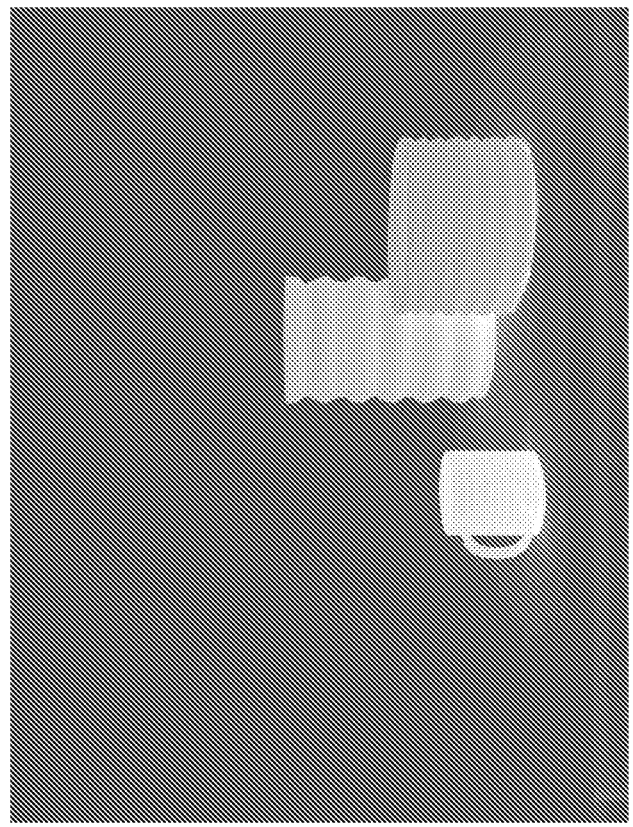

Referring to FIGS. 7a-7d, two images are shown using standard infrared imaging (FIGS. 7a and 7c), while FIGS. 7b and 7d are processed images utilizing the methods described above thereby generating surface textures for enhanced visualization.

Figure 8:
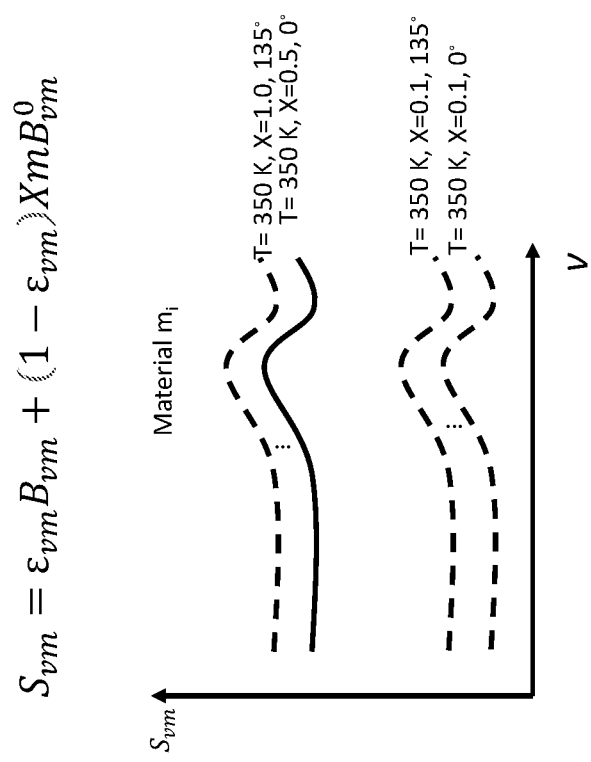
FIG. 8 is a graph of spectra vs. frequency including additional resolution owing to degrees of polarization.

While in the above-described method, spectral metadata are used to establish a match between the family of spectral curves of a material in the library based on temperature and thermal texture factor, additional accuracy can be achieved by adding linear polarization data into the mix. Towards this end, it should be appreciated that emissivity, and B (block body radiation) are not only dependent on frequency but also dependent on linear polarization. Therefore, according to one embodiment, each family of curves is not only dependent on temperature, frequency but also on degree of polarization. Referring to FIG. 8, an example of this additional resolution based on degree of polarization is shown. With this added resolution, a better match can be made to the spectral information from the scene. For example, in FIG. 8, instead of just one spectral curve for temperature T=350° K and X=0.1, a family of curves are provided for a plurality of polarizations angles. For example, according to one embodiment, if there are 4 polarization angles (i.e., 0, 45, 90, and −45), there would be four spectral curves. This additional parameter, allows added accuracy by a factor equal to the number of angles of polarization.

Those having ordinary skill in the art will recognize that numerous modifications can be made to the specific implementations described above. The implementations should not be limited to the particular limitations described. Other implementations may be possible.

The invention claimed is:

1. A method of generating object surface texture in thermal infrared images comprising:
receiving heat radiation from a scene by a spectropolarimetric imaging system adapted to generate a plurality of spectral frames associated within the scene;
generating the plurality of spectral frames associated with the scene, each frame having a plurality of pixels;
for each pixel from the generated plurality of spectral frames, extracting spectral information associated with the scene, including pixel-specific temperature representing an object's temperature, and thermal texture factor representing the object's texture;
for each of a plurality of materials having a specific emissivity in a library, generating reference spectral information as a function of temperature and thermal texture;
matching the extracted spectral information for each pixel from the generated plurality of spectral frames to the generated reference spectral information using a statistical method to minimize an associated variation; and
extracting spectral metadata from the matched reference spectral information for the associated material based on the match.

2. The method of claim 1, wherein the plurality of spectral frames from the spectropolarimetric imaging system are each generated by applying a plurality of associated bandpass filters to the spectropolarimetric imaging system and passing the heat radiation therethrough.

3. The method of claim 1, wherein the extracted spectral information associated with the scene from the spectropolarimetric imaging system for each pixel from the generated plurality of spectral frames is based on $$N_i = \sum_{v=v_{min}}^{v_{max}} Z_v \mathbb{T}_{iv} S_v \Delta v \equiv \sum_v \mathbb{M}_{iv} S_v,$$

$$\mathbb{M}_{iv} \equiv Z_v \mathbb{T}_{iv} \Delta v,$$

where $N_i$ represents output of the spectropolarimetric imaging system for each application of the associated bandpass filter i,
v represents frequency,
$\mathbb{T}_{iv}$ represents transmittance curve of each pixel of the plurality of spectral frames for discretized frequency bands between $v_{min}$ and $v_{max}$ for each application of the bandpass filter,
$\Delta v$ represents width of discretized frequency band,
$Z_v$ represents response curve of each pixel of the plurality of the spectral frames,
$\mathbb{M}_{iv}$ is a transformation matrix for each application of the bandpass filter, and
where $S_v$ represents the extracted spectral information associated with the scene, where
$S_v = (\mathbb{M}_{iv})^{-1} N_i$.

4. The method of claim 1, wherein the generated reference spectral information from the spectropolarimetric imaging system as a function of temperature and material texture for each material in the library is obtained from:

$$S_{vm} = \varepsilon_{vm} B_v + (1 - \varepsilon_{vm}) X B_v^0,$$

where $$B_v \equiv B_v(v, T) = \frac{2hv^3}{c^2} \frac{1}{e^{\frac{hv}{\kappa_B T}} - 1}, B_v^0 \equiv B_v(v, T_0),$$

where, $\kappa_B$ is the Boltzmann constant,
v represents frequency,
h is the Planck constant,
c is the speed of light,
m represents a material chosen from the library,
T represents the temperature of the target,
$T_0$ represents the ambient temperature,
$\varepsilon_{vm}$ represents the emissivity of the chosen material, and
X represents thermal texture factor.

5. The method of claim 4, wherein the generated reference spectral information from the spectropolarimetric imaging system as a function of temperature and material texture for each material in the library includes a family of spectral curves i) based on a plurality of temperatures and ii) for each temperature of the plurality of temperatures, based on variation of thermal texture factor (X), wherein the thermal texture factor is a variable between 0 and 1.

6. The method of claim 5, wherein the matching of the extracted spectral information for each pixel from the spectropolarimetric imaging system from the generated plurality of spectral frames to the generated reference spectral information is based on matching $S_v$ to $S_{vm}$.

7. The method of claim 6, wherein the statistical method includes sum of least mean squares between the $S_v$ and $S_{vm}$ meeting a predetermined threshold.

8. The method of claim 6, wherein the statistical method includes a minimum least mean squares between the $S_v$ and $S_{vm}$.

9. The method of claim 1, wherein the spectropolarimetric imaging system is further adapted to generate a plurality of polarization frames associated within the scene.

10. The method of claim 9, further comprising:
generating the plurality of polarization frames associated with the scene, each frame having a plurality of pixels.

11. The method of claim 10, wherein the plurality of linear polarization frames from the spectropolarimetric imaging system includes liner polarization at 0°, 45°, 90°, and −45°, thereby generating $I_0$, $I_{45}$, $I_{90}$, and $I_{-45}$ frames.

12. The method of claim 11, for each pixel from the generated plurality of polarization frames, further extracting spectral information associated with the scene based on the polarization angles ($S_{vp}$).

13. The method of claim 12, wherein the generated reference spectral information from the spectropolarimetric imaging system as a function of temperature and material texture for each material in the library includes a family of spectral curves ($S_{vmp}$) i) based on a plurality of temperatures, ii) for each temperature of the plurality of temperatures, based on variation of thermal texture factor (X), wherein the thermal texture factor is a variable between 0 and 1, and for each thermal texture factor (X), based on variation of polarization angle including 0°, 45°, 90°, and −45°.

14. The method of claim 13, wherein the statistical method includes sum of least mean squares between the $S_{vp}$ and $S_{vmp}$ meeting a predetermined threshold.

15. The method of claim 13, wherein the statistical method includes a minimum least mean squares between the $S_{vp}$ and $S_{vmp}$.

16. A method of generating object surface texture in thermal infrared images comprising:
receiving heat radiation from a scene by a spectropolarimetric imaging system adapted to generate a plurality of spectral frames associated within the scene;
generating the plurality of spectral frames associated with the scene, each frame having a plurality of pixels;
for each pixel from the generated plurality of spectral frames, extracting spectral information associated with the scene, including pixel-specific temperature representing an object's temperature, and thermal texture factor representing the object's texture;
for each of a plurality of materials having a specific emissivity in a library, generating reference spectral information as a function of temperature and thermal texture;
matching the extracted spectral information for each pixel from the generated plurality of spectral frames to the generated reference spectral information using a statistical method to minimize an associated variation;
extracting spectral metadata from the matched reference spectral information for the associated material based on the match;
wherein the plurality of spectral frames from the spectropolarimetric imaging system are each generated by applying a plurality of associated bandpass filters to the spectropolarimetric imaging system and passing the heat radiation therethrough; and
wherein the extracted spectral information associated with the scene from the spectropolarimetric imaging system for each pixel from the generated plurality of spectral frames is based on $$N_i = \sum_{v=v_{min}}^{v_{max}} Z_v \mathbb{T}^*_{iv} S_v \Delta v \equiv \sum_v \mathbb{M}_{iv} S_v,$$

$$\mathbb{M}_{iv} \equiv Z_v \mathbb{T}^*_{iv} \Delta v,$$

where $N_i$ represents output of the spectropolarimetric imaging system for each application of the associated bandpass filter i,
v represents frequency,
$\mathbb{T}_{iv}$ represents transmittance curve of each pixel of the plurality of spectral frames for discretized frequency bands between $v_{min}$ and $v_{max}$ for each application of the bandpass filter,
$\Delta v$ represents width of discretized frequency band,
$Z_v$ represents response curve of each pixel of the plurality of the spectral frames,
$\mathbb{M}_{iv}$ is a transformation matrix for each application of the bandpass filter, and
where $S_v$ represents the extracted spectral information associated with the scene, where $$S_v = (\mathbb{M}_{iv})^{-1} N_i.$$

17. A method of generating object surface texture in thermal infrared images comprising:
receiving heat radiation from a scene by a spectropolarimetric imaging system adapted to generate a plurality of spectral frames associated within the scene;
generating the plurality of spectral frames associated with the scene, each frame having a plurality of pixels;
for each pixel from the generated plurality of spectral frames, extracting spectral information associated with the scene, including pixel-specific temperature representing an object's temperature, and thermal texture factor representing the object's texture;
for each of a plurality of materials having a specific emissivity in a library, generating reference spectral information as a function of temperature and thermal texture;
matching the extracted spectral information for each pixel from the generated plurality of spectral frames to the generated reference spectral information using a statistical method to minimize an associated variation;
extracting spectral metadata from the matched reference spectral information for the associated material based on the match;
wherein the plurality of spectral frames from the spectropolarimetric imaging system are each generated by applying a plurality of associated bandpass filters to the spectropolarimetric imaging system and passing the heat radiation therethrough; and wherein the generated reference spectral information from the spectropolarimetric imaging system as a function of temperature and material texture for each material in the library is obtained from:

$$S_{vm} = \varepsilon_{vm} B_v + (1 - \varepsilon_{vm}) X B_v^0,$$

where $$B_v \equiv B_v(v, T) = \frac{2hv^3}{c^2} \frac{1}{e^{\frac{hv}{\kappa_B T}} - 1}, \quad B_v^0 \equiv B_v(v, T_0),$$

where, $\kappa_B$ is the Boltzmann constant,
v represents frequency,
h is the Planck constant,
c is the speed of light,
m represents a material chosen from the library,
T represents the temperature of the target,
$T_0$ represents the ambient temperature,
$\varepsilon_{vm}$ represents the emissivity of the chosen material, and
X represents thermal texture factor.

* * * * *